US011706034B2

(12) United States Patent
Anson et al.

(10) Patent No.: US 11,706,034 B2
(45) Date of Patent: Jul. 18, 2023

(54) POINT-OF-SALE SYSTEM AND METHOD

(71) Applicant: FOBISUITE TECHNOLOGIES INC., Surrey (CA)

(72) Inventors: Robert Douglas Anson, Surrey (CA); Casey Edward Matson-deKay, Victoria (CA)

(73) Assignee: FOBISUITE TECHNOLOGIES INC., Surrey (CA)

( * ) Notice: Subject to any disclaimer, the term of this patent is extended or adjusted under 35 U.S.C. 154(b) by 107 days.

(21) Appl. No.: 16/979,701

(22) PCT Filed: Mar. 13, 2019

(86) PCT No.: PCT/CA2019/050310
§ 371 (c)(1),
(2) Date: Sep. 10, 2020

(87) PCT Pub. No.: WO2019/173917
PCT Pub. Date: Sep. 19, 2019

(65) Prior Publication Data
US 2021/0049576 A1    Feb. 18, 2021

Related U.S. Application Data

(60) Provisional application No. 62/642,261, filed on Mar. 13, 2018.

(51) Int. Cl.
*G06Q 40/00*    (2023.01)
*G06Q 20/04*    (2012.01)
(Continued)

(52) U.S. Cl.
CPC .......... *H04L 9/3239* (2013.01); *G06F 3/1293* (2013.01); *G06F 16/245* (2019.01);
(Continued)

(58) Field of Classification Search
CPC .... G06Q 40/12; G06Q 20/047; G06Q 20/209; G06Q 2220/00; G06F 16/245;
(Continued)

(56) References Cited

U.S. PATENT DOCUMENTS 6,758,393 B1 * 7/2004 Luciano ............... G07G 1/0018
705/16
6,881,096 B2   4/2005 Brown et al.
(Continued)

FOREIGN PATENT DOCUMENTS

| CA | 2942079 | 3/2018 |
|----|---------|--------|
| CN | 1536776 A | 10/2004 |
| CN | 101673107 A | 3/2010 |

OTHER PUBLICATIONS

WIPO, International Preliminary Report on Patentability and Written Opinion of the International Searching Authority, dated May 15, 2019.
(Continued)

*Primary Examiner* — Paul Danneman
(74) *Attorney, Agent, or Firm* — Dickinson Wright PLLC; Andrew D. Dorisio

(57) ABSTRACT

A point-of-sale (POS) system and a data analytic platform provides receipt modification. The POS system has a receipt monitor intercepting receipt data from a POS till. The receipt monitor modifies the receipt data to produce modified receipt data and the receipt monitor transmits the modified receipt data to a receipt printer. A data processing server may receive the receipt from the receipt monitor. The server structures the receipt data, extracts one or more attributes, and may provide modified receipt data to the receipt monitor.

25 Claims, 6 Drawing Sheets

(51) Int. Cl.
  *G06Q 20/20*   (2012.01)
  *G06F 16/245*  (2019.01)
  *G06F 3/12*    (2006.01)
  *G06F 21/60*   (2013.01)
  *G06K 19/06*   (2006.01)
  *H04L 9/32*    (2006.01)
  *G06Q 40/12*   (2023.01)

(52) U.S. Cl.
  CPC ..... *G06F 21/602* (2013.01); *G06K 19/06028* (2013.01); *G06K 19/06037* (2013.01); *G06Q 20/047* (2020.05); *G06Q 20/209* (2013.01); *G06Q 40/12* (2013.12); *G06Q 2220/00* (2013.01)

(58) Field of Classification Search
  CPC ............... G06F 3/1293; G06F 21/602; G06K 19/06028; G06K 19/06037; H04L 9/3239
  See application file for complete search history.

(56) References Cited

U.S. PATENT DOCUMENTS

| | | | |
|---|---|---|---|
| 7,018,242 B2 | 3/2006 | Brown et al. | |
| 7,731,084 B2* | 6/2010 | Redick | G06Q 20/209 705/16 |
| 9,081,903 B2 | 7/2015 | Biondi et al. | |
| 9,805,352 B2 | 10/2017 | Anand et al. | |
| 10,554,792 B2 | 2/2020 | Matson-Dekay et al. | |
| 2005/0097369 A1 | 5/2005 | Bowser et al. | |
| 2005/0154799 A1 | 7/2005 | Feng et al. | |
| 2007/0028018 A1 | 2/2007 | Giroud et al. | |
| 2007/0091168 A1 | 4/2007 | Lee | |
| 2008/0109372 A1* | 5/2008 | Bykov | G06Q 20/20 705/71 |
| 2008/0276032 A1 | 11/2008 | Iida et al. | |
| 2009/0180421 A1 | 7/2009 | Hall et al. | |
| 2009/0196621 A1 | 8/2009 | Chen | |
| 2010/0030925 A1 | 2/2010 | Inoue | |
| 2011/0026525 A1 | 2/2011 | Hi | |
| 2011/0265156 A1 | 10/2011 | Bombay | |
| 2012/0191894 A1 | 7/2012 | Sasaki et al. | |
| 2014/0019242 A1* | 1/2014 | Reichert | G06Q 20/209 705/21 |
| 2014/0354888 A1 | 12/2014 | Nakamura et al. | |
| 2015/0311753 A1 | 10/2015 | Scifres | |
| 2017/0069214 A1 | 3/2017 | Dupray et al. | |
| 2017/0154001 A1 | 6/2017 | Filser et al. | |
| 2018/0084089 A1 | 3/2018 | Matson-Dekay et al. | |

OTHER PUBLICATIONS

WIPO, International Search Report, dated May 15, 2019.

* cited by examiner

POINT-OF-SALE SYSTEM AND METHOD

FIELD

This invention is in the field of point-of-sale (POS) systems, and data analytics. In particular, this invention relates to POS systems and data analytics incorporating receipt modification.

BACKGROUND

U.S. Pub. No. 2009/0006151 to Zarghami et al. describes a customer receipt data collection robotic device is connected to a point-of-sale (POS) device, such as a cash register, through an available connection link, such as an available auxiliary printer port or in-line connection. The device operates autonomously to collect receipt data for transmission to a data center for storing and processing the collected receipt data and making the results thereof accessible online to vendors and customers. The customer receipt data are tagged with the customer's ID number by scanning a customer barcode ID or a magnetic stripe customer ID store card. At the Data Center, useful data mining functions are performed on the collected receipt data, and the results are made available online to vendors for inventory control and/or product sales purposes, and to customers for accessing their purchase histories and/or for customer loyalty, discount and/or reward programs.

SUMMARY

The present invention relates to any and all aspects in any combination as understood by one of skill in the art upon reviewing the present application.

According to an aspect, there is provided a point of sale (POS) system. The POS system may have: a POS till generating receipt data and transmitting the receipt data from the POS till to a receipt printer over a data interface. A receipt monitor may intercept the receipt data from the POS till and may modify the receipt data to produce modified receipt data. The receipt monitor may transmit the modified receipt data to the receipt printer. The data interface may conform to one or more of: USB, serial, parallel port, PS/2, Bluetooth, WiFi, cellular, and Ethernet. The receipt monitor may comprise an interface board conforming to the data interface cable. The POS system may comprise a rechargeable battery supplying power to the POS till, the receipt monitor, or both the POS till and the receipt monitor. The rechargeable battery may be housed in the POS till and/or the receipt monitor.

The receipt monitor may comprise a receipt monitor processor and a tangible computer-readable medium as well as other related supporting electronic components. The tangible computer-readable medium may store instructions to configure the receipt monitor processor. The instructions may comprise: storing the receipt data in a receipt data buffer; structuring the receipt data; encrypting the receipt data; and/or compressing the receipt data. According to an aspect, the receipt monitor may comprise extracting one or more attributes from the structured data using the receipt monitor processor; and storing the one or more attributes into a database stored on the tangible computer-readable medium.

The receipt monitor may comprise a communication channel, and the tangible computer-readable medium further comprises instructions to: transmit the receipt data to a data processing server; and receive the modified receipt data from the data processing server. The communication channel may be selected from: a Wi-Fi network, a Bluetooth network, a cellular network, and a wired network.

The POS system may have a bypass switch to bypass the receipt monitor.

The modified receipt data may have one or more of: a coupon, promotional information, a barcode, and a 2D barcode. The modified receipt data may have a cryptocurrency payment address that may be expressed as a barcode or a 2D barcode.

According to another aspect, there is provided a data processing server. The data processing server may have a processor executing instructions from a tangible computer-readable medium, a communication channel, and a database of retail transactions. The instructions may comprise: receiving a receipt data from one or more receipt monitors over the communication channel; structuring the receipt data into structured data using the processor; extracting at least one attribute from the structured data using the processor; storing the at least one attribute into a database stored on the tangible computer-readable medium. The structuring step may comprise forming a columnar data table. The instructions may comprise: querying the database to generate one or more aggregated metrics. The instructions may comprise: transmitting the one or more aggregated metrics to a remote computer system for display.

The instructions may comprise: archiving the receipt data; and providing an interface to print an exact reproduction of a receipt corresponding to the receipt data.

The instructions may comprise: receiving an identifier from the at least one receipt monitor; and associating the identifier with a transaction history. The instructions may further comprise: receiving at least one third party identifier from a remote computing system; associating the at least one third party identifier with the identifier from the at least one receipt monitor; and/or receiving at least a portion of a third party transaction history when an association occurs between the at least one third party identifier and the identifier from the at least one receipt monitor.

The instructions may comprise: transmitting a notification to the receipt monitor when the identifier corresponds to a blacklisted identifier stored in the database. The instructions may comprise: receiving an error message from the receipt monitor; and/or transmitting a notification to a technician computing device.

The instructions further comprise: modifying the receipt data by incorporating one or more of: a coupon and a promotion to produce a modified receipt data; and transmitting the modified receipt data to the receipt monitor. The instructions may comprise: identifying the coupon or the promotion based on one or more identifiers and the receipt data. The instructions may comprise: determining a number of coupons distributed by the one or more receipt monitors; and/or determining a number of coupons redeemed by the one or more receipt monitors.

The instructions may comprise: performing an image to text conversion on the receipt data.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Figure 1A:
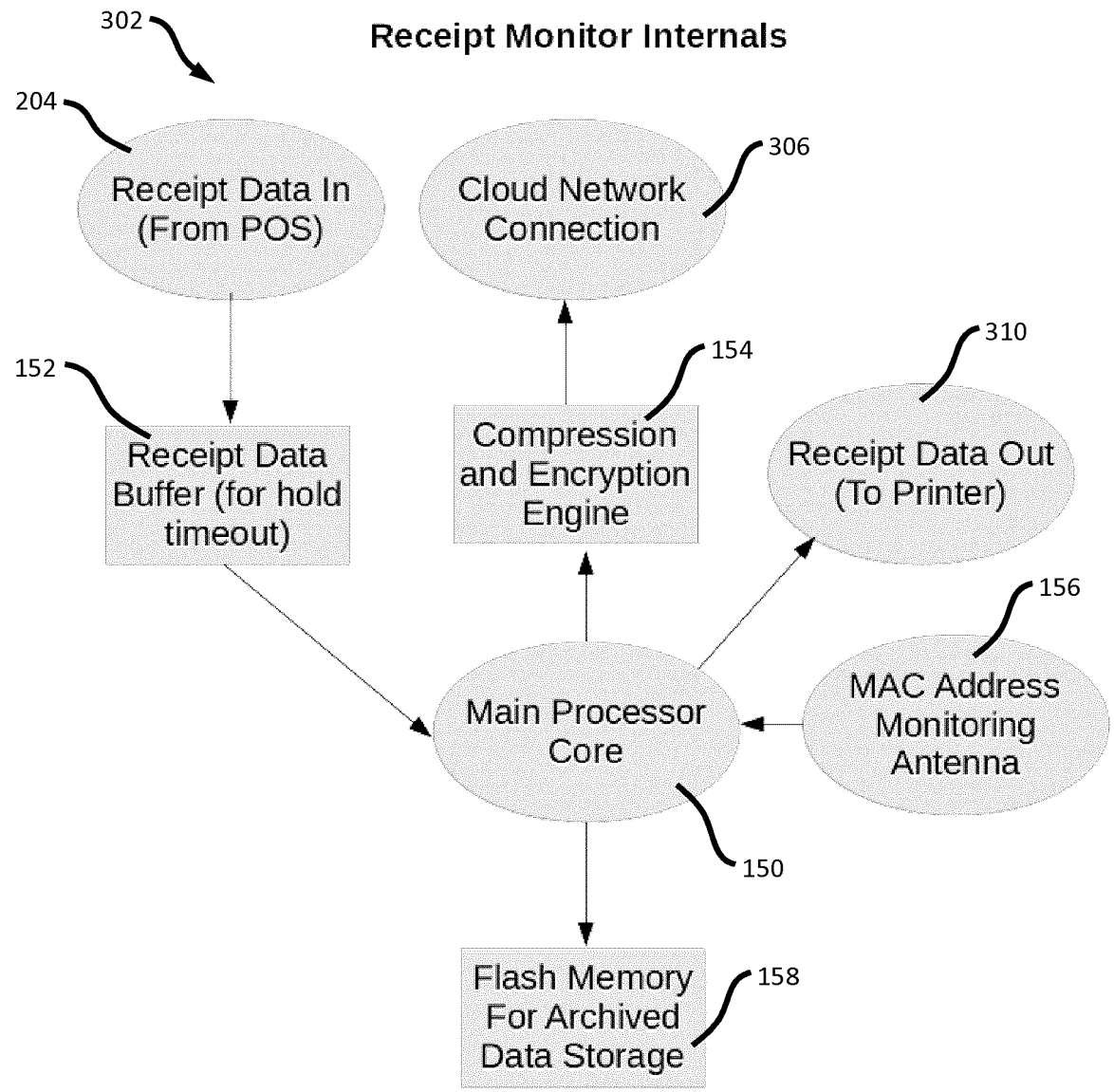
FIG. 1A is a block diagram demonstrating a receipt monitoring device.
Figure 1B:
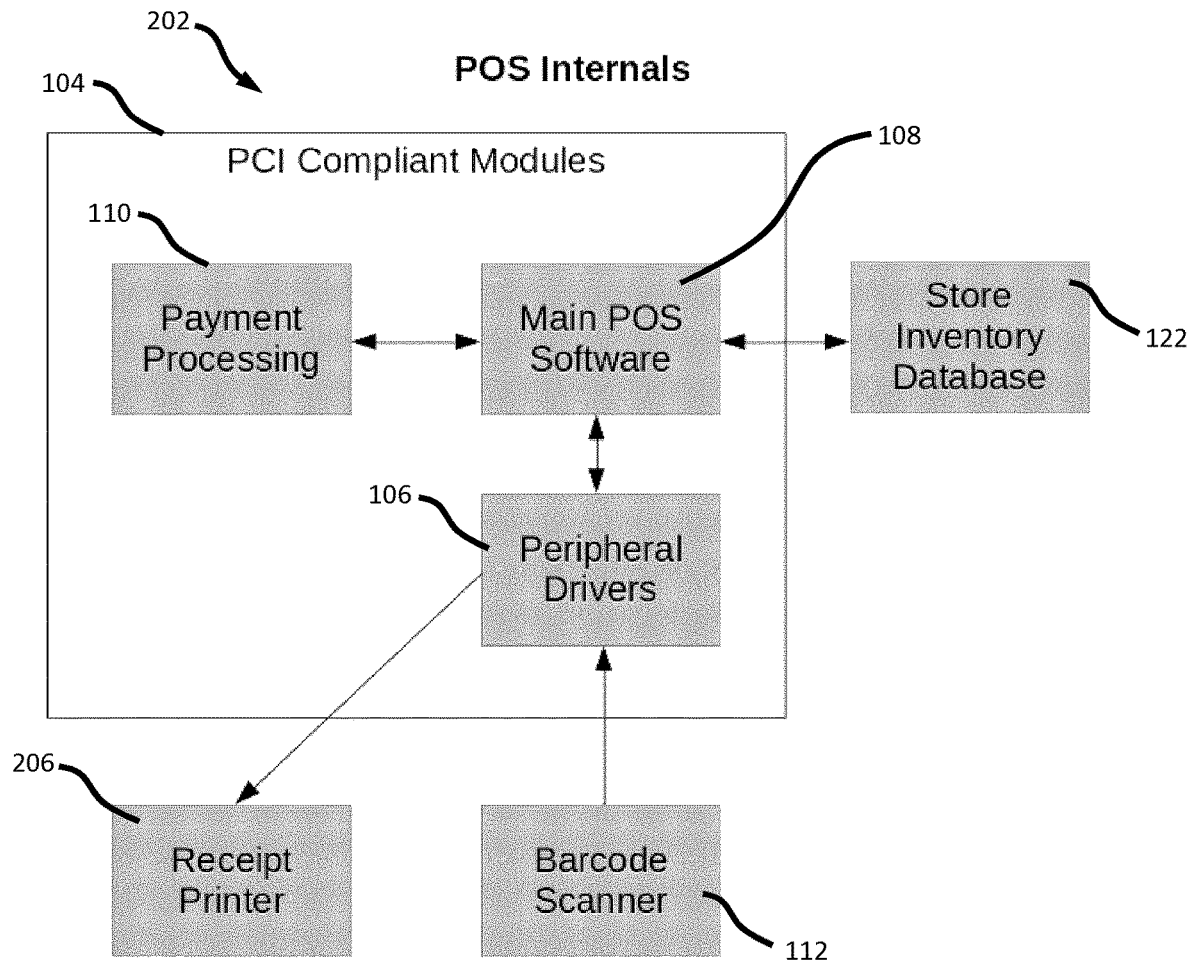
FIG. 1B is a block diagram demonstrating a Point of Service till.
Figure 2:
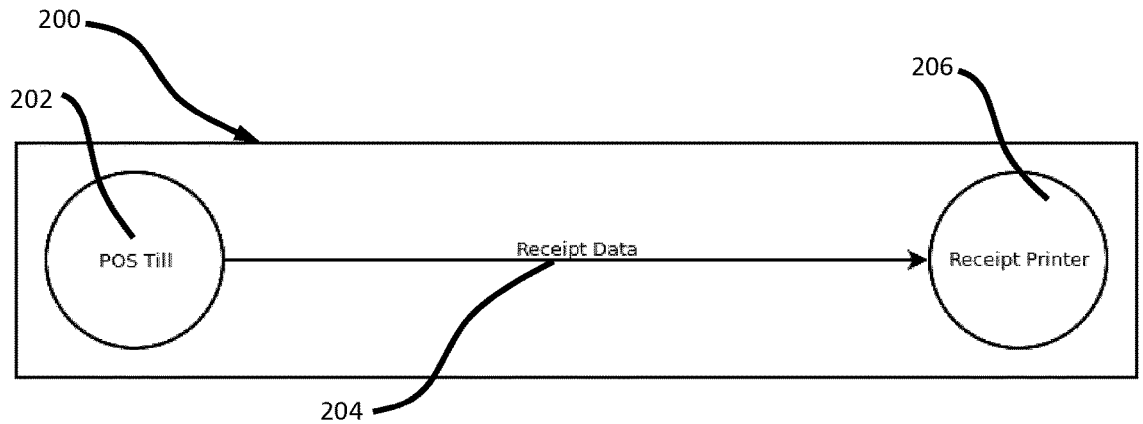
FIG. 2 is a block diagram demonstrating a POS system in communication with a receipt printer.
Figure 4:
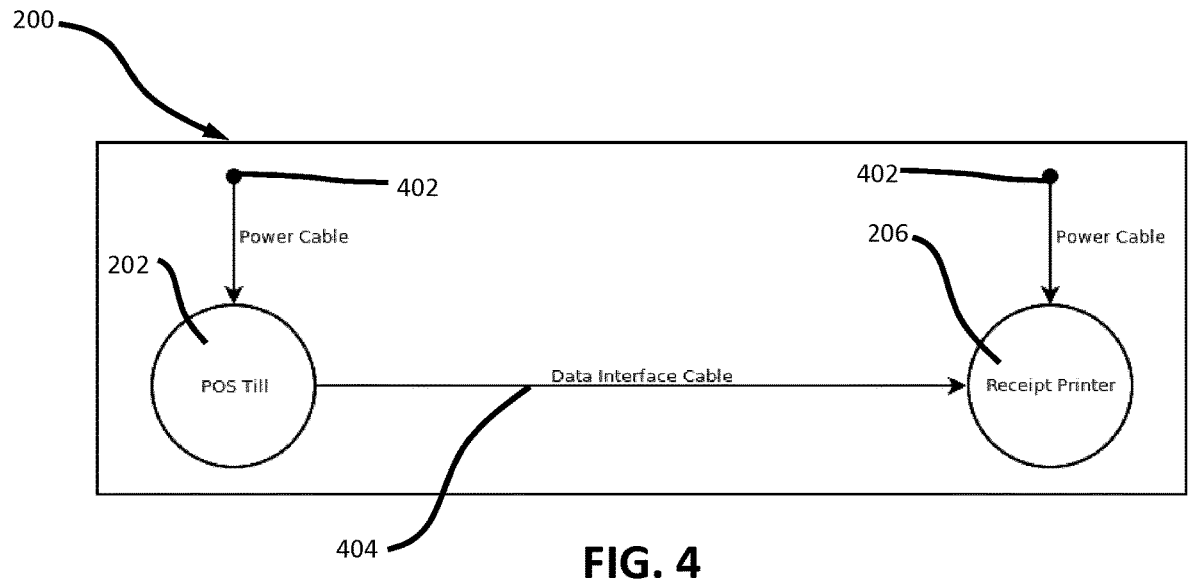
FIG. 4 is a block diagram showing a physical cable connection without the receipt monitoring device.

Turning to FIGS. 1B, 2, and 4, there is provided a point of sale (POS) system 200 without a receipt monitoring device 302. The POS system 200 may comprise a POS till 202 that is generally known in the art. The POS till 202 typically scans a plurality of goods that a shopper wishes to purchase using a barcode scanner 112. A main POS software 108 executing on the POS till 202 may receive a purchase price for each of the plurality of goods, totals the purchase prices into a total, and receives payment from the shopper via a payment processor 110.

A number of modules of the POS till 202 may be PCI-DDS (Payment Card Industry Data Security Standard) compliant modules 104. The PCI compliant modules 104 may comprise a peripheral drivers 106 module, the main POS software 108 module, and the payment processor 110. The peripheral drivers 106 communicate with the barcode scanner 112 and the receipt printer 206.

When the payment has been received by the main POS software executing on the POS till 202, the POS till 202 transmits receipt data 204 to a receipt printer 206. In this aspect, the POS till 202 communicates with the receipt printer 206 via a data interface cable 404. The POS till 202, the data interface cable 404, and the receipt printer 206 may conform one of the following interfaces: USB, serial (9-pin), serial (25-pin), parallel port, PS/2, Bluetooth, WiFi, and Ethernet (TCP/IP). Each of the POS till 202 and the receipt printer 206 may receive electrical power from a power cable 402.

As can be seen from the POS system 200 of FIGS. 1B, 2, and 4, upgrading the POS system 200 is expensive, both in hardware and training, and difficult to modify. Retail companies typically use legacy hardware and software which does not implement technological advances that have occurred since the last refresh of the hardware. The use of legacy hardware may prevent the retail companies from performing analytics, customer engagement, brand loyalty, and data-driving advertising. In order to provide these enhanced features, solutions exist requiring complete replacement of costly hardware and/or software upgrades of the POS system 200 in order for the POS system 200 to work in conjunction with a data analytics solution. Further difficulties may be experienced as the existing POS system 200 may interface with corporate servers or other systems in a way which is proprietary, old, delicate, or any number of legacy problems. Legacy POS systems 200 may cost anywhere from $2,000-$4,000 per POS system 200, resulting in upwards of $25,000 per retail location, requiring significant capital.

Figure 3:
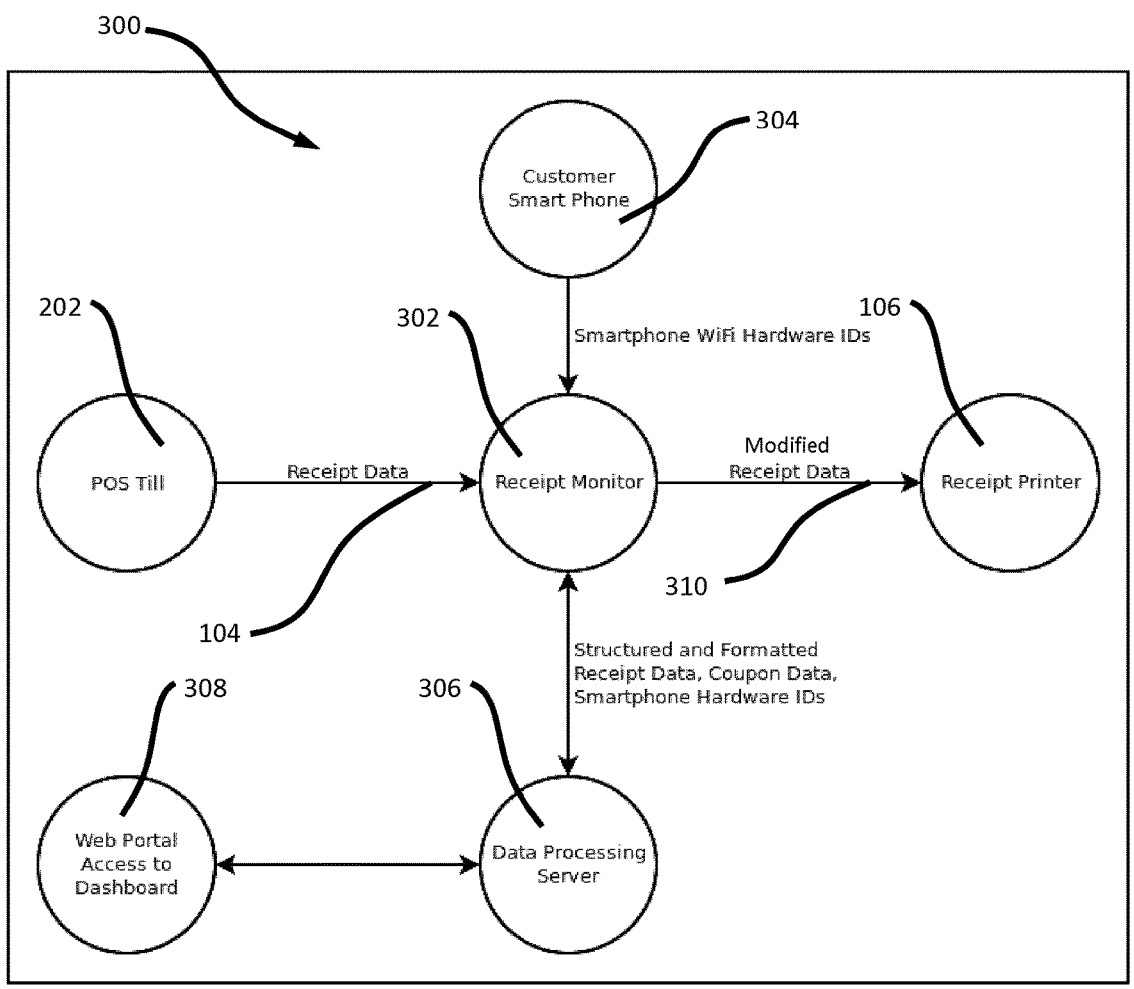
FIG. 3 is a block diagram showing the POS system working in conjunction with a receipt monitoring device according to one aspect.
Figure 5:
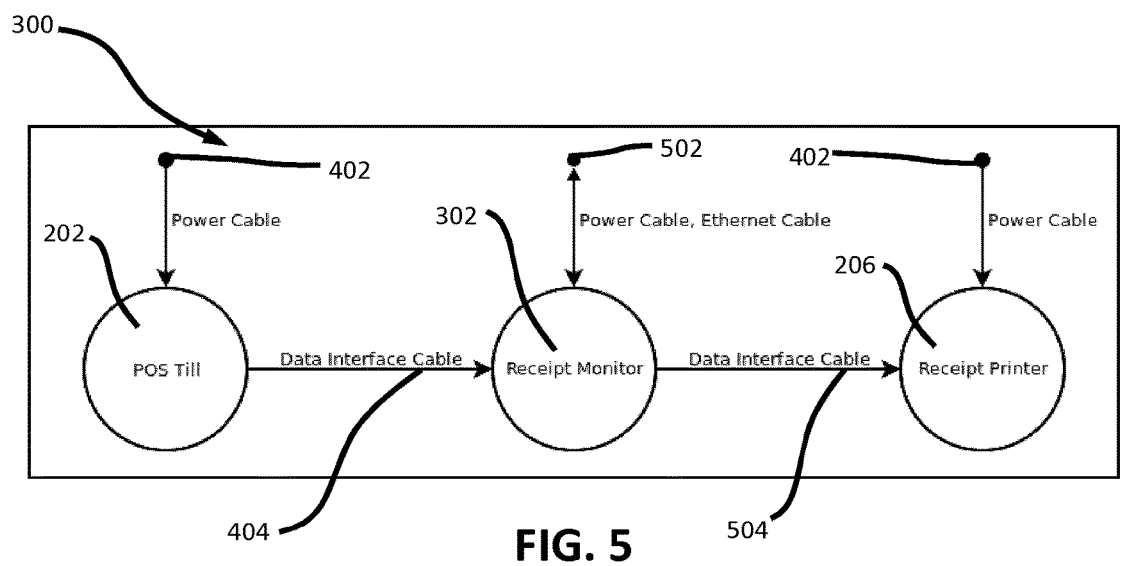
FIG. 5 is a block diagram showing the physical cable connection with the receipt monitoring device.

According to another aspect presented in FIGS. 1A, 3 and 5, a POS system 300 may comprise a POS till 202 communicating with a receipt printer 206 using a similar manner of communication as for the POS system 200 previously described. However, in this aspect, the POS system 300 comprises a receipt monitoring device 302 (also called herein a receipt monitor 302 for brevity) intercepting the receipt data 204 being transmitted to the receipt printer 206. The receipt monitor 302 may be a hardware device that is installed between the POS till 202 and the receipt printer 206. The receipt monitor 302 may be physically connected to the data cables connecting the POS till 202 to the receipt printer 206. The receipt data 204 may comprise SKU numbers, price, tax, date, time, quantity purchased, last four digits of a credit card number, rewards program data, and other information depending on the software used in the POS system 200.

The receipt monitor 302 may not be required to be compliant with PCI-DDS (Payment Card Industry Data Security Standard) that is a set of security standards which limit access to the computers and networks which process payments via a credit card. The standard is prolific and strict, and as such, all solutions which rely on implementing software onto the POS till 202 must comply with PCI compliance laws. Since the receipt data 204 typically comprises generally non-identifiable data, the receipt data 204 may not be covered by PCI compliance and therefore, the receipt monitor 302 is not required to undergo the rigorous PCI compliance audit. The information on a receipt is also not considered personally identifiable information (PII data), reducing the burden of responsibility for the provider of the receipt monitor 302.

The receipt monitor 302 may intercept and modify receipt data 204 prior to the receipt data 204 being received by the receipt printer 206. The intercepted receipt data 204 may be stored unmodified in a receipt data buffer 152. The main processor 150 may structure the receipt data 204 and encrypt and/or compress 154 the receipt data 204 prior to transmission to the server 306 or cloud computing network. In other aspects, the encryption and/or compression 154 may be performed with a dedicated integrated circuit. The receipt monitor 302 may read all (or a portion) of the receipt data 204 traveling across the data cable from the POS till 202 to the receipt printer 206 and vice versa. The receipt data 204 may be either passively monitored and stored, or the receipt data 204 may be modified to add, remove, or modify the information before the modified receipt data 310 may be forwarded to the receipt printer 206 as described in further detail below.

The receipt monitor 302 may comprise a main circuit board, which may contain a Wi-Fi module for monitoring a MAC address 156 to connect to a Wi-Fi network, as well as the main processor 150. The main circuit board also may comprise a Bluetooth® module for communicating with mobile devices and printers, a cellular internet connectivity module for internet connectivity via cell networks, and a rechargeable battery for backup power in case the power cord becomes disconnected. The main circuit board contains pin headers, which are used to connect the main circuit board to a secondary circuit board, called an interface board. The interface board may provide communication hardware compatible with the data interface cable 404 used to connect the receipt printer 206 and the POS till 202. The interface board may provide a multi-interface (e.g. parallel, USB, serial, PS/2, TCP/IP, Bluetooth, WiFi) that comprises bidirectional communicative hardware. In another aspect, there may be multiple different interface boards for each particular type of data interface cable 404. In some aspects, the interface board may be removable so that the interface board may be replaced with one corresponding to the particular type of data interface cable 404.

The receipt monitor 302 may be used as a general conversion tool for converting signals sent via the communication interface used by receipt printers 206, and converting the signals to TCP/IP packets, which may be transmitted over a cellular, wired, and/or Wi-Fi network (e.g. the Internet) to a server 306. Since these networks may be typically faster than the receipt printer 206, no degradation of normal performance should be experienced.

However, in some instances, the receipt monitor 302 may experience outages causing the receipt printer 206 to become non-functional. If the receipt monitor 302 stops working or experiences some other type of error, an emergency bypass switch may cause the data interface cable 404 to be directly bridged to the data interface cable 504 effectively reconnecting the POS till 202 with the receipt printer 206 in an original configuration. The emergency bypass switch may ensure that no software or functional issues with the receipt monitor may cause interruption in the normal operation of the receipt printer. This emergency bypass switch may be a physical toggle switch that may be flipped by an employee or may be a switch automatically flipped using software. In some aspects, the emergency bypass switch may be activated remotely if the receipt monitor 302 and/or the data processing server 306 detects an unrecoverable error. The emergency bypass switch may be activated even if a catastrophic error causes all software on the receipt monitor to become non-functional. The emergency bypass switch may function as long as the receipt monitor 302 has a power source. In the case that the power cable becomes disconnected from the receipt monitor 302, a battery backup may power the emergency bypass switch circuit to ensure the receipt printer 206 continues operating until the battery is depleted.

The cellular module in the receipt monitor 302 may enable the receipt monitor 302 to not be dependent on a separate WiFi connection. While the receipt monitor 302 may use an existing WiFi connection in the retail store, the WiFi connection may be unreliable and subject to dropouts and/or disconnection. The retail store may not have an existing WiFi network to which the receipt monitor 302 may connect. The cellular module may guarantee internet connectivity for the receipt monitor as long as the cellular module is able to receive a cell signal.

The cellular module may function by connecting to the internet using one or more of the standard cellular networks (e.g. 3G, LTE, 5G, etc.) commonly used by smartphones to connect to the internet. The cellular module may be directly integrated into a circuit board of the receipt monitor 302, and as such, each receipt monitor 302 may have a SIM card assigned with a phone number, and a subscription to a data plan of a cellular company.

As the receipt data 204 may be more standardized (e.g. a uniform and/or predictable format) across different types of POS tills 202 or in a similar format, the receipt monitor 302 may be more readily able to interpret the receipt data 204 provided to the receipt printer 206. Many POS tills 202 use a receipt template into which information is then added. This uniform and consistent structure of a receipt may allow the interpretation of the receipt data 204 by the receipt monitor 302 without requiring costly data processing methods and/or human intervention, since certain pieces of data may always appear in the same location for every receipt. The uniform and consistent structure may enable the automated collection of key pieces of receipt data as long as the POS system continues to print receipts using the same receipt template.

Although the receipt monitor 302 may not be PCI compliant, the receipt data 204 collected by the receipt monitor 302 may be secured in various ways. For example, all receipt data 204 may be encrypted before the receipt data 204 is transmitted to the data processing server 306. The receipt data 204 may be encrypted such that only the data processing server 306 may decrypt the encrypted receipt data 204. In some aspects, only aggregated receipt data may be viewable by employees and/or retailer stakeholders to comply with privacy legislation. In other aspects, only administrators of the data processing server 306 may decrypt the encrypted receipt data 204 for diagnostic purposes.

Another way is to encrypt the receipt data 204 may be in a blockchain. The blockchain provides overall trust in the receipt monitor 302, without having to trust one particular individual or party. The receipt data 204 received by the receipt monitor 302 may be collected and implemented with blockchain technology using an open-source blockchain project, such as Ethereum or Hyperledger Fabric, to provide a foundation for building a custom platform for storing and using analytics of the receipt data 204. A blockchain infrastructure may be used to prove: an amount of receipt data 204 collected by the receipt monitor 302 to stakeholders; a lifetime spend to customers for rewards collection purposes; or encrypt the receipt data 204 in a way that makes the data 204 viewable only by authorized parties.

For example, the data 204 may be stored partially on a blockchain using a platform, like Ethereum, where an Ethereum smart contract may be created to interface with the receipt monitor 204. The smart contract may create periodic digital cryptographic receipts (e.g. not paper receipts) that state how much receipt data 204 has been collected in that period, number of redemptions, etc., and a cryptographic signature, or "hash", of the actual receipt data 204. Through storing the digital cryptographic receipts in the blockchain, the blockchain requires less data storage. If at a later date, the stakeholder who is given access to the receipt data 204 would like to verify an authenticity, a computer associated with the stakeholder may generate an independent cryptographic signature from the receipt data 204, and compare the independent cryptographic signature to the cryptographic signature logged in the blockchain. If the independent cryptographic signature and the cryptographic signature from the blockchain match, this match proves that the receipt data 204 corresponding to the signature is authentic.

In another more scalable example such as Hyperledger Fabric or a custom built blockchain, the receipt data 204 may be directly stored on the blockchain, rather than only the cryptographic signatures as previously described above. Storing receipt data 204 in the blockchain may provide more functionality by, for example, permitting third parties to verify payment for the receipt data 204 corresponding to every printed receipt, coupon or redemption. By being able to prove each coupon or redemption, the stakeholder may be able to prove a performance of one retailer against other retailers, or answer any other queries which normally rely on trusting a company or individual to represent their data as true. One disadvantage may be that the storage of the receipt data 204 may require more data storage for the blockchain.

In another example, if desired, the receipt data 204 may be logged in a blockchain ledger in order to provide transparency and verifiability between the relevant stakeholders.

For example, if the provider of the data processing server 306 claims that 200,000 receipts have been collected, a stakeholder may independently verify the validity of this claim. The stakeholder may use a blockchain client to cryptographically prove the number of receipts without the stakeholder actually having access to the receipt dataset.

In situations where the retailer may not be allowed to over-sell a particular product above a certain quota (e.g. due to government regulations or other legislation), the retailer may provide a summary of the sales to a regulatory entity in order to prove that the retailer meets the compliance criteria set out by the regulatory body. However, no guarantee exists that the provided aggregate data is accurate, as the retailer may have modified the aggregate data due to negligence or possibly knowingly violating the quota cap for various reasons. In order to limit legal issues, the retailers could simply modify the sales totals before submitting the aggregate data to the regulatory body for compliance verification. For example, this situation has occurred in the cannabis industry in Las Vegas with dispensaries overselling cannabis past the quota limit to particular customers. This overselling has resulted in the dispensaries losing their license.

Installation of the receipt monitor 302 may help reduce this type of fraud. The fraud may be reduced because the data collected by the receipt monitor 302 should match the aggregated data that the retailer submits for compliance verification. If the aggregated data does not match, a problem may be indicated or a blatant modification of the aggregated data submitted by the retailer. The receipt monitor 302 may become a "backup" or a "safety net" transaction record keeping system for regulatory bodies, which are tasked with ensuring retailers do not sell outside of an assigned quota or other type of restriction.

By combining the data 204 recorded by the receipt monitor 302 with appropriate access controls for relevant stakeholders, the receipt monitor 302 may provide a way to verify compliance for blockchain technology, access to this data 204 may be carefully controlled by any or all of the regulatory bodies, retailers, the receipt monitor company, or other relevant stakeholders in order to ensure no modification of data is occurring through existing transaction reporting channels. This access control of the data 204 may mitigate the risk of a data breach, because the permissions and level of access to the receipt monitor data 204 may be defined in the blockchain from inception, and may be configured to be unmodifiable without authorization from this may be done without necessarily requiring all stakeholders having access to the receipt data 204.

According to an aspect, the receipt monitor 302 may upload the raw receipt data 204 to a data processing server 306. The receipt monitor 302 may perform minimal data processing before the receipt data 204 is sent to the data processing server 306. When the receipt data 204 is in this raw form, it is called "unstructured" data. The unstructured raw data may be the exact same byte stream that the printer received from the POS. Once the unstructured data reaches the server 306, each receipt data 204 entry may be processed into "structured" data, where important attributes of the receipt data 204 entry may be extracted and stored into a columnar data table. The receipt data 204 may be structured using an regular expression (regex) or other text and data parsing technologies, which may utilize the consistent structure of the receipt data, and extract appropriate values, which are then stored in a database on the server 306. The receipt may be additionally processed using additional steps by the receipt monitor 302 before the text is processed into structured data. For example, if the receipt data is in an image format, the image may be converted to text using optical character recognition (OCR) before the text is processed into structured data. Once the receipt data 204 entry has been structured, the structured data may be queried through a language like SQL, in order to generate aggregated metrics and information, which may then be displayed using visual dashboards or other outputs.

In some aspects, the unstructured data may be discarded by the data processing server 306. In other aspects, the unstructured data received by the server 306 may be stored for archival purposes. For example, if the raw receipt data 204 processing has an error in the algorithm causing missing or incorrect information, the unstructured archive may be retrieved and reprocessed in order to correct any errors that had been introduced by the incorrect structuring step. The storage of unstructured raw receipt data may also be retained for the compliance verification aspects previously described. If discrepancies exist regarding the interpretation or data processing algorithms resulting in certain figures or statistics, the unstructured raw receipt data that was used to generate the figure or statistic may be reviewed to determine a cause of the discrepancy.

Maintaining a compressed archive of the raw unstructured receipt data may ensure any receipt collected by the receipt monitor 302 may be reproduced on the model of printer that the receipt was originally printed on. For example, the receipt data may contain formatting information specific to that model of receipt printer 206. While this information may not be required in order to generate analytics and other information, maintaining the formatting information may allow the receipt to be exactly reproduced by that model of receipt printer 206. The ability to reproduce the receipt may be helpful in situations where retailers keep receipts for tax purposes, and/or other compliance reasons.

According to one aspect, the collection of receipt data 204 by the receipt monitor 302 may be performed in real-time or near real-time. This timely processing may allow for real-time reporting of receipt data to the server 306 and may permit analyzing information in transactions during short time periods (e.g. seconds and minutes) rather than only transactions which take place over an extended period (e.g. shown over hours or days). If, for example, the server 306 determines significantly increased sales for one particular item begins to occur due to a special event or other circumstance, retail managers may be alerted in real-time via text, e-mail, or push notification as soon as the volume exceeds normal levels or passes other criteria. This notification may allow managers to respond to possible inventory shortages in a timely manner. For example, this notification may increase a probability that the store will receive inventory before inventory levels become depleted, so more items may be ordered and shipped to the store before the special event ends.

Figure 6:
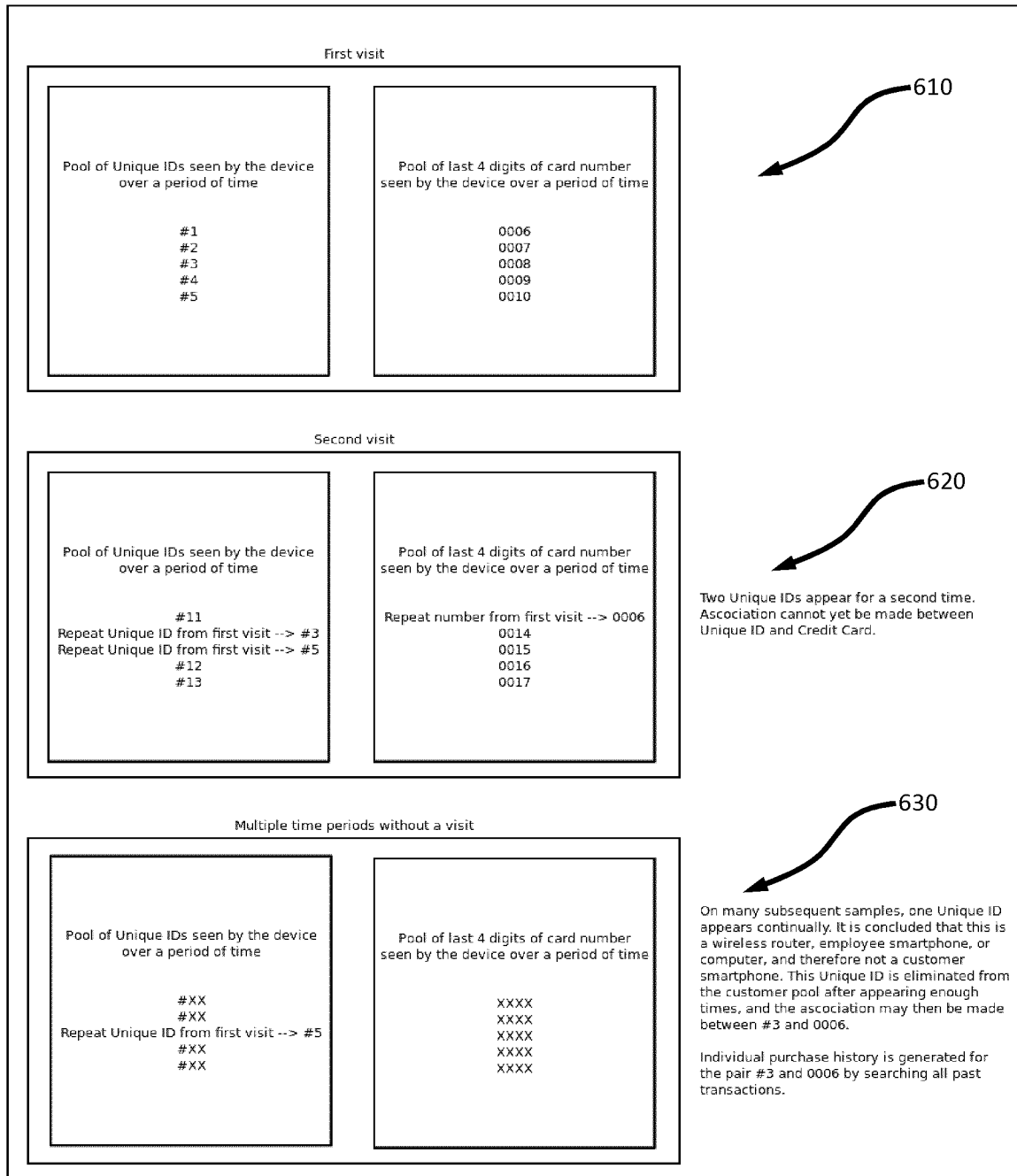
FIG. 6 is a block diagram of three use case scenarios according to an aspect.

According to another aspect, the receipt data 204 may provide individualized purchase history for one or more customers that frequent the store. The individualized purchase history may allow the retailer to generate granular reports that may determine a cause and effect relationship that drives sales for an individual customer. A monitoring of individual customers may be performed using the Wi-Fi module within the receipt monitor 302 as described with reference to FIG. 6. The Wi-Fi module may monitor all of the Wi-Fi connection data transmitted by any device in range. This Wi-Fi connection data may be information transmitted by wireless routers, mobile phones, or any other wireless device that has a Wi-Fi adapter. The receipt monitor 302 collects a hardware identifier (ID) number, such as a MAC address, which is contained in every packet of data transmitted by the Wi-Fi device (step 610). This hardware ID does not contain any personal information as the hardware ID is a semi-random string of digits unique to the Wi-Fi device that is transmitting the Wi-Fi connection data.

In the event that the mobile device does not have Wi-Fi enabled, the receipt monitor 302 may be able to provide receipt data 204 without identifying the individual. The receipt monitor 302 may also be able identify the individuals with Wi-Fi enabled. For example, in the compliance situation, when a retailer has a limitation on an amount of product per individual customer and the customer has turned off Wi-Fi or other identifying data transmission, the receipt monitor 302 may prompt the retailer to obtain other identifying information from the customer and/or refuse to process the transaction. The receipt monitor 302 may provide alerts about genuine overselling (which are transmitted to retail staff or regulatory bodies) without providing a false positive.

While the receipt monitor 302 may collect and generate individual customer transaction history based on MAC addresses, the receipt monitor 302 may also collect the transaction history through an existing retailer loyalty program. In one aspect, the receipt may contain a customer ID number which may be collected by the receipt monitor 302. Upon processing of receipt data by the server 306, the customer ID number may be associated with past receipts that contain the same customer ID number, and may be used to generate analytics on individual transaction histories. Any unique piece of information, or set of information, which identifies a customer may be used to associate the transaction history to that customer identity.

While the receipt monitor 302 may be disabled or rendered ineffective by unplugging, disconnecting, or otherwise impeding the functionality, the receipt monitor 302 may log these occurrences and report them to the data processing server 306. If the device loses internet connectivity, but maintains power by the power cable or battery backup, and remains connected to the POS till 202, receipt data 204 collected may be stored locally on the receipt monitor 302 to be transmitted when internet connectivity resumes. This functionality may allow for receipt data collection during circumstances that could otherwise cause receipt data to be lost or delayed.

The battery backup in the receipt monitor 302 may allow the receipt monitor 302 to maintain operation under circumstances where the power cable becomes disconnected from the receipt monitor 302. Upon disconnection from the power cable, the receipt monitor 302 may continue operation as usual until the battery depletes. In another aspect, the receipt monitor 302 may send an alert to the central server 306, which may notify support staff that the receipt monitor 302 has been disconnected, and attention is required by support or retail staff to reconnect the receipt monitor 302 to power. In another aspect, the receipt monitor 302 may send this alert, enable the emergency bypass switch, and may enter a low-power mode, such that only the emergency bypass electronics may operate. The low-power mode may prolong the life of the battery backup, and may increases the amount of time the receipt printer 206 may continue operating before the battery backup depletes. During this period, no receipt data may be collected. When the power cable is re-connected to the receipt monitor 302, the receipt monitor 302 resumes normal operation, and the battery backup may be charged until the battery returns to full capacity.

The receipt monitor 302 may associate the unique hardware ID with the paper receipt that is printed from the receipt printer 206. If the customer has a mobile phone and visits the store, the phone may transmit the hardware ID. If the customer makes a purchase at the store with a credit card, the receipt data may contain the last 4 digits of the credit card number and may also contain first and last name of the customer (step 610). On subsequent visits by the same customer, the same data may be collected, assuming the customer has the same phone in their pocket, and uses the same credit card (step 620).

Based on this collected data, the software running on the server 306 and/or the receipt monitor 302 may make an association between the hardware ID of the phone (e.g. MAC address) and the last 4 digits of the credit card number. The association may then be correlated to the purchase history for that individual customer, rather than just purchase history for the consumer base as a whole (step 630). The association may provide more relevant information for the store, the customer, and all other stakeholders.

By using the Bluetooth connectivity of the receipt monitor 302, the receipt monitor 302 may also connect to a loyalty or rewards app on the mobile device of the customer. The loyalty or rewards app may provide relevant data to the shopper as the receipt monitor 302 detects the presence of the mobile device via the Bluetooth connection.

According to another aspect, the receipt monitor 302 may have a set of blacklisted hardware IDs. For example, the hardware ID of a shoplifter may be added to the set of blacklisted hardware IDs. If the hardware ID is subsequently detected by one or more of the receipt monitors 302, then an alert may be sent to store managers or security. The alert may comprise any additional information about the shoplifter (e.g. description, digital photograph, etc.). Security may then observe video surveillance for the shoplifter. When used in conjunction with the server 306, the server 306 may comprise a list of hardware IDs corresponding to shoplifters caught by many different retailers. The list of shoplifters may also contain photographs, descriptions, typical items stolen, etc. In some aspects, the set of blacklisted hardware IDs may be periodically updated to a local computer system for use by the retailer and/or the receipt monitors 302. For the store to relay all detected hardware IDs to that local computer system. The local computer system may then determine if any of the hardware IDs are on the blacklist. If a blacklisted hardware ID from the hardware IDs is detected, the local computer may requests further information from the server 306. In other aspects, the receipt monitor 302 may transmit every detected hardware ID to the server 306 and the server 306 determines if the hardware ID is on the blacklist. The server 306 may then send an alert to a computing device (such as a computer, laptop, mobile phone, etc.) of security and/or the store manager.

According to the aspects herein, the data processing server 306 may provide a web-based portal 308 that may provide access by client computers to relevant stakeholders, such as store managers or other personnel to view the collected data. According to one aspect, a dashboard, in the form of a web application, may display graphs and charts of important metrics and key performance indicators. This dashboard may allow the retailer or other stakeholder to configure the functionality of the receipt monitor 302 and associated services. Through this interface, store managers, corporate employees, or any other relevant stakeholders may view the aggregated information collected by the receipt monitors 302. The dashboard may display the aggregated information in a format permitting easy methods for processing, digesting, analyzing, and taking action upon. The dashboard may also provide the ability to create and modify parameters regarding the two-way communication functionality of the receipt monitor 302. For example, the circumstances under which the receipt monitor 302 may include a coupon within the modified receipt data 310 may be modified through this web dashboard. The dashboard may also provide comparisons for a business to other businesses in the geographic area, such as how a particular store or region compares to other similar businesses in geographic area.

Since the receipt monitor 302 may be installed on any POS system 200 that may comprise a receipt printer 206, there is no limitation to how the data collected by the receipt monitor 302 may be aggregated. If the retailers and associated stakeholders consent to the use of their receipt data, the receipt data from many different retail locations may be aggregated to provide a comprehensive view of an entire industry, city, or other large geographic area. This sharing of receipt data may enable large stakeholders such as manufacturers, brands, distributors, government, and/or the corporate branch of retailer chains to view aggregated information from a plurality of sources in real-time across company boundaries over which receipt data would not normally be shared.

Under certain circumstances, if desired, the receipt monitor 302 may add, remove, or modify the receipt data 204 to produce modified receipt data 310 to be sent to the receipt printer 206. The modification may allow inserting coupons, promotional information, etc. without slowing down printing of a paper receipt. The receipt monitor 302 may receive coupon data and/or promotional data from an internal memory and provide one or more instructions to be embedded into the modified receipt data 310. The receipt printer 206 may then print a coupon corresponding to the coupon data and/or a promotion corresponding to the promotional data onto the paper receipt. The insertion of the coupons or promotional information may be seamless and does not affect the functionality of the POS till 202 from the perspective of a retail employee.

In one aspect, a set of the coupons and/or promotional data may be periodically provided to the receipt monitor 302 (e.g. daily, weekly, etc.). This periodically provided data may not be targeted to a particular customer, but may be targeted based on the store location and/or data regarding the inventory of the store. For example, promotions and/or coupons may be provided targeting items that are overstocked. These coupons and/or promotions may be injected onto the receipt that the POS prints. In this aspect, the receipt monitor 302 may only collect receipt data 204 and send the receipt data 204 to the data processing server 306 during normal operation. In such an aspect, the communication between the receipt monitor 302 and the server 306 may be "unidirectional" during normal operation. For example, the receipt data 204 may only be sent to the data processing server 306, and the server 306 does not routinely send any data back to the receipt monitor 302 except under certain special circumstances when updating the content of promotional material.

In another aspect, the coupon and/or promotional data provided to the receipt monitor 302 may be targeted to provide an increased relevance to the customer associated with the receipt data 204. For example, the data processing server 306, in response to receiving the receipt data 204, may transmit coupon data and/or promotional data to the receipt monitor 302. The response from the data processing server 306 may be considered "bidirectional" communication as the data processing server 306 sends a timely response back to the receipt monitor 302 and the receipt monitor 302 may incorporate that response data into the modified receipt data 310. The receipt monitor 302 may then display the coupon data and/or advertising data on a display and/or may print the information on the receipt printed by the receipt printer 206. In some aspects, the receipt monitor 302 may transmit the coupon data and/or advertising data to a customer's mobile phone 304.

In this manner, the receipt monitor 302 receives receipt data from the POS system 200. The receipt monitor 302 may transmits this receipt data to the central server 306, but may not send the receipt data to the printer 206. The receipt monitor 302 may then waits for the central server 306 to respond with server receipt data. This server receipt data may be the same data, or modified receipt data with promotional information added, and/or other changes to the receipt. When the receipt monitor 302 receives this server receipt data from the central server 306, the receipt monitor 302 may sends this server receipt data to the receipt printer 206. In this manner, the receipt monitor 302 may allow for live modification of the receipt data in real-time.

In some aspects, the receipt monitor 302 may have a timer corresponding to a receipt hold time to receive the modified receipt data or other data from the server 306. The receipt hold time corresponds to a maximum amount of time the receipt monitor 302 may wait for the server 306 to respond before providing the original, unmodified receipt data to the receipt printer 206 for printing out the physical paper receipt in unmodified form. The timer enables the receipt printer 206 and receipt monitor 302 to function (albeit without injecting real-time promotional information) in the event that internet connectivity is lost. If internet connectivity is lost, the receipt monitor 302 may store the receipt data 204 in memory 158 to be transmitted to the server 306 when internet connection has been reestablished. In this aspect, the timer may range from about 0.2 seconds to 2 seconds after transmitting the receipt data 204 to the server 306. The round trip time may change because of irregularities in internet connection, large receipts which may take longer to process and/or transmit, and performance characteristics of the receipt monitor 302, receipt printer 206, and/or POS system. The timer may be shorter rather than longer in order for the paper receipts to print in a timely manner.

The data processing server 306, upon receiving receipt data 204 may perform a query based on the hardware ID or other customer identifying information within a database of customer data in order to determine the individual customer and retrieve their transaction history. The selected coupon and/or promotional data may be determined, at least in part, based on the individual customer data. The determination of the coupon and/or promotional data may be determined based on which items a general population tends to buy together, as well as items that this particular customer tends to buy together. This determination may also be based on any other factors or algorithms.

In other aspects, the receipt monitor 302 may derive relevant advertisements or information based on the receipt data available on only one particular receipt. For example, if the receipt data contains item A, the receipt monitor 302, in conjunction with the server 306, may apply a coupon on the receipt for item B. Similarly, if the receipt data contains item B, the coupon may be for item A, in order to promote more shopping by the customer on a subsequent visit.

According to some aspects, the data processing server 306 may determine which selected coupon and/or promotional data may be incorporated based on a cross-promotional platform for retailers and brands in a common geographical area. Different stakeholders may bid on physical receipt space at another retail outlet that sells related products, but may not be not a direct competitor. For example, a fishing store may bid on receipt advertising space at a marine store.

In another aspect, the receipt monitor 302 may be implemented across independent retailers to provide a universal rewards program. For example, rewards points the customer earns through one independent retailer may be redeemed at another respective independent retailer. The receipt monitor 302 may also intercept data traveling from a barcode scanner 112 to the POS till 202 in order to redeem the points or promotions generated through the rewards program. In other aspects, the reward program number may be present within the receipt data 204 which may be determined by the receipt monitor 302. If the receipt monitor 302 intercepts the barcode to authenticate the customer's reward account.

By utilizing the ability of the receipt monitor 302 to seamlessly modify data in real-time, and the lack of dependence on particular receipt printers 206, or even hardware, the receipt monitor 302 may also be connected between the POS till 202 and the barcode scanner 112. The connection between the POS till 202 and the barcode scanner 112 may enable the customer to enroll in a rewards program that may exist for any retail store which has the receipt monitor 302 installed on both the receipt printer 206 and the barcode scanner 112. A barcode in a rewards mobile smartphone app may be scanned by barcode scanner 112, where the barcode may be recognized by the receipt monitor 302 connected to the barcode scanner 112. The items purchased may be logged by the receipt monitor 302 connected to the receipt printer 206, and reward points may be added to an account associated with the customer.

If the customer would like to redeem the reward points at the retailer, a barcode in the app may be scanned by the barcode scanner 112 to be used to redeem the reward points. The receipt monitor 302 may be connected to the barcode scanner 112 and may intercept the scanned barcode data, verify the barcode data is a valid redemption code, and may converts the barcode data into multiple denominations of discount barcodes that the POS till 202 recognizes. For example, a $7 redemption barcode associated with a universal rewards system may be scanned by the barcode scanner 112 and may be intercepted by the receipt monitor 302, and converted to barcodes for −$5, −$1, and −$1, which the receipt monitor 302 would send to the POS till 202. The POS till 202 may then recognize and apply as the discounts to a transaction total. The universal rewards system may then provide unique and changing universal redemption codes that may be used in the app, but the discount codes would only need to be imported into the POS till 202 system once.

In another aspect, the customer may collect points for the transaction by presenting the rewards program ID number barcode on a mobile device for scanning by the barcode scanner 112. The barcode may be received by the receipt monitor 302 and transmitted to the data processing server 306, which contacts servers of the reward program providers. The data processing server 306 may then provide a portion of the receipt data 204 corresponding to the transaction to server 306 of the selected rewards program provider. The receipt monitor 302 may not send this barcode to the POS till 202.

While the intention of the receipt monitor 302 may be to work independently, the receipt data 204 collected may be sent for additional processing or collection by a third party. For example, the server 306 may access third party data available from a pre-existing rewards or loyalty program database. In this case, the existing infrastructure of the rewards program may utilize the additional information provided by the receipt monitor 302 to send appropriate notifications or promotions to customer via existing cell phone apps, rewards cards, and/or software on POS tills 202, or other pre-existing communication channels.

The receipt monitor 302 may leverage other existing sources of transaction information and analytics in order to provide improved accuracy and comprehensiveness of analytics provided to the retailer and other stakeholders. For example, if the retailer's computer system has a pre-existing database 122 of transactions purchased through the retailer's e-commerce site, then the receipt monitor 302 may use that previous data in conjunction to the offline, brick-and-mortar transactions in order to provide a more complete picture of the purchases occurring for a particular retailer. These analytics may be important due to a situation where transactions may appear to be falling for a retailer, but in reality, the transactions are simply shifting from offline transactions to online e-commerce transactions.

In another example, the customer may walk into the store with the mobile phone. The receipt monitor 302 receives the hardware ID associated with the mobile phone and the data processing server 306 identifies, via a database query, the customer as a frequent customer. The data processing server 306 then retrieves the individualized purchase history. As the clerk completes the transaction at the POS till 202, the receipt data 204 is sent down the data cable 404 to the receipt printer 206. Before the receipt data 204 reaches the printer 206, the receipt monitor 302 intercepts the receipt data 204, and sends the receipt data 204 to the data processing server 306 in real-time or near real-time. The server 306 analyses the receipt data 204, and a decision is made to offer this particular customer a coupon, based on the receipt data 204 containing an item which is commonly bought together with a second item. The server 306 determines if the second item is present within the receipt data 204. If the second item is not present, the server 306 sends a message to the receipt monitor 302 instructing the receipt monitor 302 to include coupon data for the second item. The receipt monitor 302 then incorporates the coupon data into the modified receipt data 310. The server 306 logs the receipt data 204 for this particular transaction. The paper receipt is printed, along with the coupon, based on the modified receipt data 310, having a delay of approximately one second. The relevant coupon has been added to the paper receipt with no intervention from the POS till 202, or any employees, nor has any action been required by the customer.

In another aspect, the receipt monitor 302 may enable retailers to accept cryptocurrency transactions. For example, the receipt monitor 302 may have a public payment address of the store stored in memory or may receive the public payment address from the data processing server 306. For each transaction (or alternatively only when selected), a Quick Response (QR) code may be added to the modified receipt data 310 causing the receipt printer 206 to print the QR code thereon. The customer, using a mobile cryptocurrency wallet application executing on a mobile phone, may then scan the QR code to retrieve the public payment address to pay the receipt using a cryptocurrency, such as Bitcoin, Ether, Litecoin, SIACoin, or other type of cryptocurrency. In other aspects, the receipt monitor 302 may display the QR code on a screen display for scanning by a mobile device prior to transmitting the modified receipt data 310 to the receipt printer 206.

In some aspects, the receipt monitor 302 may determine a total amount due from the receipt data 204 and send the total amount due to the data processing server 306. In response, the data processing server 306 retrieves an equivalent cryptocurrency amount based on a current exchange rate. The server 306 then generates a QR code requesting the equivalent amount and the public payment address. The QR code may then be transmitted to the receipt monitor 302 where the QR code is injected into the modified receipt data 310. When the QR code is scanned by the mobile device and a payment is received at the public payment address, the server 306 confirms a completed transaction and sends a "payment confirmed" message to the receipt monitor 302. In response, the receipt monitor 302 may print out a physical transaction confirmation receipt, presenting a confirmation message on the POS till 202 for the retail clerk that the payment was successful.

The QR code may facilitate a cryptocurrency transaction to occur by having the receipt monitor 302 injects the cryptocurrency data into the receipt. The QR code may take other forms, such as a loyalty and rewards card number, which may be imported into mobile payment apps such as Google Pay or Apple Pay by scanning the QR code. The QR code may also take the form of a gift card or other type of scannable financial instrument. In other aspects, it may also take the form of a normal barcode which may be scannable by the POS system barcode scanner 112, rather than a QR code in the event that the barcode scanner 112 is unable to scan the QR code.

The receipt monitor 302 may act as an intermediary payment tracking device for retailers involved in the cannabis industry. In particular for the United States, the cannabis industry is legal in some states, but is still prohibited federally. This legal status results in cannabis dispensaries being prohibited from using federal banks or credit card processors that have entities in states where cannabis is illegal. This results in a large amount of physical cash transactions. Local banks may also be concerned about money laundering and tax evasion due to this cash-based business. These local banks may benefit from a legitimate sales record derived from the receipt monitor 302 that may be audited, which promises that the cash is from legitimate sales at the dispensary sales.

Banks and payment processors may be provided with the sales record required in order to comply with anti-money laundering regulations for transactions from cannabis-focused businesses having the receipt monitor 302. If the receipt monitor 302 is used in conjunction with reporting provided from the retailer, comparing the data may provide further evidence that the cash transaction with the bank is legitimate and not the result of any illegal activities.

The compliance aspects described herein may be equally relevant for tax-collecting entities in government, which can verify that the aggregated sales as reported by the retailer, the independent transaction data 204 collected by the receipt monitor 302, and the dollar value of tax revenue collected from the retailer all yield the same value. This three point verification may further reduce the chances of tax evasion and grey market activities in industries such as cannabis.

The compliance piece of the receipt monitor 302 may be used in conjunction with an inventory management system. When the data processing server 306 is connected to a retailer's inventory database, the receipt monitor 302 may track the inflow and outflow of products. This tracking may ensure that all the shipments that go to the store are accounted for through sales. This inventory data may also be provided to regulatory bodies for the purposes of auditing and compliance of product handling regulations. The inventory data may also be used to enable the retailer to determine if any products are being lost through methods other than sales (such as theft, spoilage, or other issues).

With the ability to collect a transaction history for each individual product sold to each individual customer, the receipt monitor 302 may allow retailers to notify any customers which have been sold a product for which a recall or health advisory has been issued. The receipt monitor 302 may allow notifying any customers for any retailers for which transaction history has been collected and who have been sold the recalled product. This recall functionality may permit rapidly deployable safety alerts for industries where products such as medications, food products, or safety-critical equipment is sold.

In another aspect, a coupon buying and selling platform may be implemented into a blockchain. The blockchain may be used to keep track of and verify buying and selling orders for advertising on paper receipts. Customer rewards and other personal information may also be recorded and tracked through the blockchain. By tracking this data within the blockchain, ownership of reward points and other stores of value may be proven. Encrypting this data within the blockchain may reduce customers' fearing of losing points. For example in 2016, the Air Miles rewards program almost canceled $250 million worth of reward points. With blockchain technology, it would be impossible to delete or invalidate points.

For example, the receipt monitor 302 may enable rewards points to be kept track of by scanning a unique barcode on the mobile device of the customer. By scanning the barcode, the receipt monitor 302 and server 306 may keep track of how many points a rewards account has. In one aspect, the rewards data may be kept track of and managed by a private company. In another aspect, the rewards data may be stored on the blockchain using a smart contract deployed on the Ethereum network. A publicly accessible reward points database may store the number of points for each account. The database may be public, but does not contain any personally identifiable information other than each account being assigned a random string of characters, which may be encoded into a barcode, that may be used to identify the account and account balance.

The smart contract may contain a set of terms of the rewards points at inception, such as conditions like expiration dates, or ability to transfer points to other customers. Since the points are kept track of on the blockchain, the only way to modify the terms of the smart contract after the fact would be to invalidate all reward points and start fresh a new rewards program with new terms. All other conditions, such as point value, point expiration date (if it exists), or other terms are immutable after smart contract creation.

Miners on the Ethereum (or similar) network may verify these smart contracts. The rewards points may be created by administrators (e.g. similar to how shares of a company may be issued) using functionality built into the smart contract. The points may then be assigned to customers' accounts in response to receipt data 204 being received by the server 306.

On redemption, these points may be destroyed, or returned to the administrators' account. Alternatively, the points may be transferred to the retailer where the points are redeemed. The retailer may then redeem the points with their suppliers or with the administrators' account.

In another aspect, the blockchain may be used as an audit trail for government-monitored stores (e.g. firearms, cannabis, liquor, greenhouse gas emissions, chlorofluorocarbons, pharmacies, prescriptions, etc.). Conventionally, the government relies on the government-monitored store to be trustworthy when reporting a transaction history and typically relies on audits and penalties if inaccuracies are present. The government audit may have difficulties in determining honest omissions versus a clear intent to deceive. This difficulty may lead to the audits becoming costly for both businesses and the government as each side must defend their position. The receipt monitor 302 may provide a verifiable history of transactions and customer presence during transactions by storing all transactions in a ledger within the blockchain. The government may then audit the transactions with a guarantee that the transaction history is valid and true. In some aspects, the blockchain may be used in conjunction with traditional record keeping in order to verify that the receipt data 204 via the traditional method is the same as the data collected using the receipt monitor 302. If discrepancies are found, a cause of the discrepancy may be quickly isolated and investigated.

In another aspect, a doctor may issue a prescription coin associated with a prescription to a patient. The patient may then spend the prescription coin at a pharmacy where a computer of the pharmacy adds the transaction to a healthcare blockchain. When the patient tries to use a copy of the prescription at another pharmacy, the other pharmacy may check the healthcare blockchain and refuse to fill the prescription that has already been filled. A doctor's office may also check the healthcare blockchain before issuing a new prescription to determine if the patient has been previously prescribed the drug or similar drugs by another doctor.

Similarly, in another aspect, a government department may issue coins associated with controlled substances (e.g. cannabis) periodically to citizens who are signed up to receive these coins. The citizen may then spend these coins at retailers (e.g. dispensaries). The dispensaries may remit these coins back to the government department for verification. In this manner, the government may control how much of the controlled substance an individual may be consuming.

Figure 7:
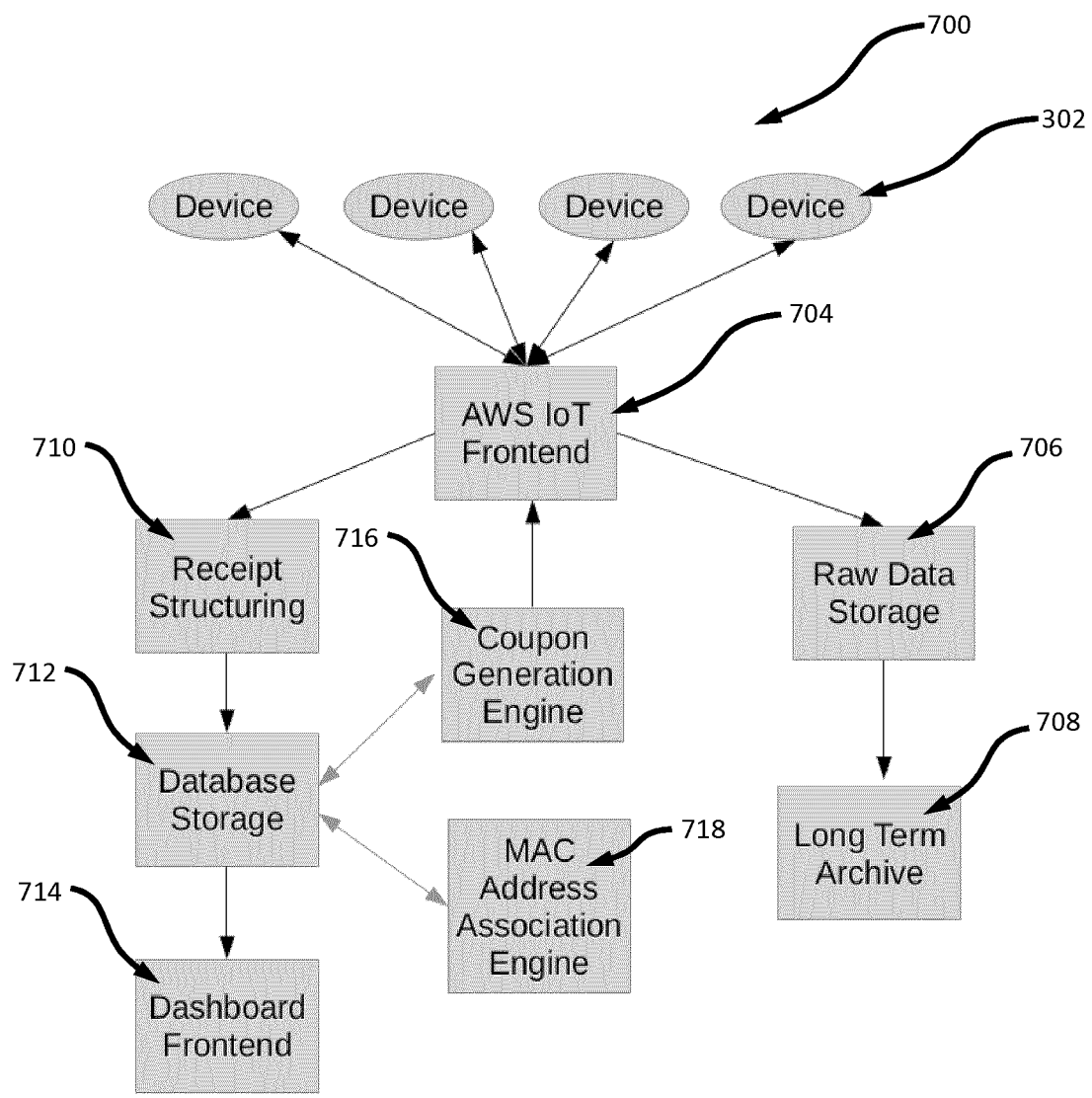
FIG. 7 is a block diagram of a cloud architecture for receipt analysis according to an aspect.

Turning to FIG. 7, a cloud architecture 700 is presented having a plurality of the receipt monitors 302 in communication with an Internet of Things (IoT) front end 704. The IoT front end 704 receives receipt data 204 from each of the receipt monitors 302 and may produce three copies of the receipt data 204. One copy of the receipt data 204 may be processed using a receipt structuring engine at step 710. The receipt structuring engine retrieves an appropriate regular expression or other data processing instructions from the database and applies the regular expression or other processing commands to the receipt data 204. The regular expression or other data processing instructions transforms the receipt data 204 into a columnar format, which may then be stored within a receipt database at step 712.

The second copy of the raw receipt data 204 may be stored in raw data storage 706 and eventually a long term archive 708 for diagnostic purposes. The third copy of the receipt data 204 may be stored on the IoT front end 704 until the structured receipt data is stored within the receipt database at step 712.

At this time, a coupon generation engine 716 may retrieve the structured receipt data from the database storage 712. The coupon generation engine 716 may also retrieve any relevant purchase history from other structured receipts and analyze the structured receipt data and/or purchase history to find a most relevant coupon or promotion data which is currently available. The coupon generation engine 716 may determine the most appropriate coupon based on numerous factors. One factor may be determining the most relevant coupon by analyzing popular item pairings (or groupings) amongst a whole consumer population. The coupon generation engine 716 may generate a coupon when one or more of items in the popular group of items is missing from the receipt data 204. The coupon generation engine 716 may be based on a statistical analysis, which analyzes a purchase history dataset for an entire consumer population, and may generate coupons based on correlated, statistically likely events, such as for example, umbrellas being popular when the weather forecasts rain, or jackets being popular in winter. The most relevant coupon may also be determined by the active periods of the promotions of third parties. For example, if a brand will be running a discount offer for a particular product for one month, the coupon generation engine 716 may put the discount offer for that item on in the modified receipt data 310 for that one month period.

The coupon generation engine may generate coupons from a variety of sources. In one aspect, the coupon generation engine may be configured to provide coupons for current promotions at that retail location, such as a store sale for the week following Christmas. In another aspect, the coupon generation engine may be configured to provide coupons for third parties such as brands. An example may be the coupon generation engine providing coupons to all receipt monitors 302 that are installed in liquor stores, promoting the sale of a particular beer brewer's product. The coupon generation engine may allow brands to engage directly with the customers at the same time, despite the customer's purchasing the brewer's products across many fragmented and/or unassociated liquor stores. Rather than a brand or other distributor having to call hundreds of independent liquor stores and convince the stores to advertise their product, the brand or other distributor may configure the promotion using a configuration interface of the receipt monitor 302, and the brewer's ad may be displayed on receipts where the ad is relevant.

In one aspect, the receipt monitor 302 may allow stakeholders to determine how many coupons were distributed and/or redeemed. Currently, many coupons are physically counted in order to determine how many were redeemed by a particular retailer, in order to reimburse the retailer with the discounts provided by the coupon (e.g. assuming that the coupon is provided by the brand, and the brand is the party covering the expense). Tracking of the number of coupons that were scanned by the retailer using the receipt monitor 302 connected to the barcode scanner 112 may allow a report to be generated and provided to the brand in order to eliminate the manual counting of redeemed coupons. Data may be generated for brands and other stakeholders regarding how many coupons were distributed through the receipt monitor 302, and enable an analysis of the ratio of coupons distributed versus redeemed for a particular store and/or multiple stores.

Once this relevant coupon data is determined, the coupon generation engine 716 sends the relevant coupon data back to the IoT frontend 704. The IoT front end 704 may insert the coupon or promotion data into a predefined location within the structured receipt data of the original receipt. The modified receipt data 310 may then sent back to the receipt monitor 302, and the receipt monitor 302 sends the modified receipt to the receipt printer 106. If the hold period has expired on the receipt monitor 302 (e.g. meaning that the cloud process 700 has taken too long), the receipt monitor 302 may print an unmodified receipt, and discard the modified receipt received from the cloud.

The relevant coupon data that the coupon generation engine 716 retrieved from the database 712 may comprise individualized purchase history for the individual making the transaction at that moment. If this is the case, a hardware address association engine 718 has associated a hardware ID (such as a MAC address or other unique ID) observed by the receipt monitor 302 to an individual customer. The MAC address association engine 718 performs a process of elimination as previously described with reference to FIG. 6.

The cloud architecture 700 may serve the processed receipt data from the database storage via a dashboard front end 714, which may provide aggregated statistics about the purchases and transactions that have occurred and stored in the database 712.

If an error ever occurs with the receipt structuring engine 710, the coupon generation engine 716, database storage 712, and/or the hardware association engine 718, all or a portion of the receipt data 204 may be retrieved from raw data storage 706 to be reprocessed using updated or corrected programming. The long term archive 708 may be a similar form of raw data storage, except implemented on technology that may be slower, more secure, and/or less expensive. The receipt data 204 from the raw data storage 706 may be moved in batches to the long term archive 708 after the receipt data 204 ages past a predefined period of time.

Although the aspects herein describe the data processing server 306 as a discrete hardware device, other aspects may have the server 306 hosted on a virtualization platform such as a server 306 hosted on Amazon Web Services (AWS) or other type of cloud services platform. In some aspects, the data processing server 306 functions may be performed by the receipt monitor.

Although the aspects herein describe the receipt data 204 being transmitted to the server 306 in real-time, other aspects may have the receipt data 204 collected by the receipt monitor 302 and stored for transmission to the server 306 in batches. In some aspects, if the receipt monitor 302 loses connectivity to the data processing server 306, the receipt monitor may still collect and store information for transmission when connectivity resumes. In some aspects, the receipt monitor 302 may perform limited actions based on receipt data 204, such as injecting default coupons, during a loss of connectivity.

Although the aspects described herein demonstrate a wired communication protocol between the POS till 202, the receipt monitor device 302, and the receipt printer 106, other aspects have the POS till 202 communicating with the receipt printer 106 by a wireless communication protocol such as Bluetooth, Wi-Fi, wireless USB, and/or other wireless communication. When Wi-Fi is used by the POS till 202 to communicate with the receipt printer 106, the receipt monitor 302 may intercept the receipt printer data 204 by changing the IP address of the receipt monitor 302 to the IP address of the receipt printer 106. The IP address of the receipt printer 106 may then be changed to a different IP address known to the receipt monitor 302. Under this configuration, the receipt monitor 302 may forward all data received from the POS IP address to the printer IP address, performing normal receipt modifications if required. While this change may require modification of a configuration of the receipt printer 106 by a technician, no modification may be required to the software of the POS till 202.

Although the aspects herein describe the receipt printer 106 being powered via a power cable 402, other aspects may have the receipt printer 106 be primarily battery powered.

Although the aspects herein describe identifying customers based, in part, on hardware IDs, other aspects may identify customers based on other attributes. For example, a unique code called an MEI or IMSI number may be used to identify the hardware or SIM card associated with the mobile phone. This MEI number may be correlated to the last 4 digits of the credit card number as previously described. Customer reward account numbers printed on the receipt may also be used as a unique customer ID.

In other aspects, facial recognition may be used to help identify customers in the event that the mobile phone may not be transmitting its corresponding hardware ID, a customer uses multiple different credit cards, or for misidentification of the corresponding hardware ID where two people may be frequently shopping together. The receipt monitor 302 may be integrated with cameras installed at the POS till 202. The cameras may have a field of view with a high probability of observing a face of the customer. While the customer is checking out, the camera captures images of their face. The captured images may be used to train an artificial neural network (ANN) configured to recognize faces from image data. The trained face may then be stored with the hardware ID, last 4 digits of the credit card number, and the purchase history in the server database 712.

In some aspects, one or more cameras may be installed with a field of view encompassing the entrance to the store. The one or more cameras may recognize individual faces entering the store and the server 306 may push notifications to an application executing on the customer's mobile device. One or more physical coupon dispensers may be located at the front of the store dispensing personalized coupons and/or advertisements for certain identified items when the customer enters the store.

In another aspect, voice recognition may be used to identify the individual customer using microphones located at the receipt monitor 302. Identification data may comprise if the customer is male or female, sounds tired or energized, or other mood information, etc. By combining image and voice data collected through cameras and microphones as previously described, in addition to the receipt data 204 being collected by the receipt monitor 302, retailers may be provided a complete data of their customers, such as customer satisfaction with the shopping experience and how best to increase sales. Voice data may be collected through interaction with personal shopping assistants or in store avatars as described in further detail below.

According to some aspects, the store may have one or more conversationally interactive robots that may act as personal shopping assistants. The personal shopping assistant may incorporate voice recognition technologies like Amazon's Alexa and Google Home as describe in further detail below. Utilizing the receipt data 204 collected by the receipt monitor 302, the personal shopping assistant may use this receipt data 204 to assist in making recommendations and help customers locate products within the store. These assistants may come in the form of voice-controlled avatars on cell phones, in store robotic assistants, and/or voice activated computer terminals (with maps and other information of the retail store). These will all be used to increase the accuracy and effectiveness of retail advertising, and focus on making advertising a customer centric experience.

According to the aspects described herein, the receipt monitor 302 and associated cloud data processing systems may generate individual consumer behavior information for the purposes of suggesting products that the customer is likely to buy based on this behavioral information. In another aspect, promotional content and advertisements may be displayed to the customer through life-like, virtual avatars, which may be computer characters that speak and interact with the customer similar to a human, via screens. For example, behavioral information for the customer may be generated by the receipt monitor 302 and associated cloud systems as described.

In one example, if the customer is known (via the hardware ID) to be located in front of, or near to, a display screen at the retail location, then a computer system running software to display avatars may display a virtual avatar that advertises the most relevant promotion or advertisement through a text-to-speech technology. In this aspect, the normally written advertisement for the receipt data 204 may become an audio and/or visual advertisement. The virtual avatar may increase customer engagement because the customer sees and hears the advertisement rather than possibly missing the advertisement on the paper receipt.

In one aspect, the virtual avatar may be displayed on a large screen, or interactive digital signage. In another aspect, the virtual avatar may be displayed and interact with the customer through an application executing on the mobile phone of the customer. Examples of these avatars may be Amazon's Alexa, Apple's Siri, and Google Home. These avatars currently only provide a voice-only avatar to the user that is tailored to their behaviors by linking the avatars to their email, social media, or other online presence. The functionality of the avatars may be improved by having these avatars work in conjunction with the techniques described herein.

The data collected by the receipt monitor 302 may be leveraged by third party advertising or display technologies. For example, large digital signage displays, such as those seen in shopping malls, may communicate with the receipt monitor 302 and/or central server 306 in order to display content at appropriate times based on the purchases that are occurring. For example, if a digital display company has been paid to display ads for brand A and brand B, then the digital display may coordinate which ad to display based on the data the digital display receives from the receipt monitor 302 (e.g. display an ad for brand A when brand B is purchased, and vice versa).

Third party systems meant to interact with customers may work in other ways as well, such as interacting with shoppers via voice, text, emails, cameras, and other interactive systems. These systems may use both transaction information, as well as customer presence systems such as WiFi hardware ID collection, Bluetooth connections to loyalty apps, etc. in order to provide a more relevant and applicable experience for the shopper.

The aspects described herein may be particularly applicable to a "hub and spoke" model of retail. The hub and spoke model has a hub, such as a stadium, mall, entertainment venue, amusement park, or other popular destination, and surrounding retail businesses (e.g. the spokes) geographically located around the hub. For example, a stadium may be the hub and the concession stands may be the spokes. In another example, a theme park may be the hub with souvenir shops being the spokes. The collection of detailed receipt data 204 from the spokes may enable the hub to identify deficiencies in the spokes. The hub may also provide coupons to the spokes in order to build business relationships. Likewise, the retailers may be able focus on the particular theme of the hub and tailor the business to appeal to that particular theme. Receipt data 204 from different hub and spokes with a similar theme may be used to identify one or more strengths and weaknesses of that particular location and improve accuracy of advertising and business efficiency efforts of the hub and spokes.

The foregoing is considered as illustrative only. Any and all aspects may be used in any and all combinations as would be understood to a person of skill in the art upon reviewing the present application. Further, since numerous changes and modifications may readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A point of sale (POS) system comprising:
   a POS till generating receipt data;
   a data interface configured to transmit the receipt data from the POS till to a receipt printer;
   a receipt monitor intercepting the receipt data from the POS till;
   the receipt monitor comprises a receipt monitor processor; a tangible computer-readable medium; the tangible computer-readable medium storing instructions to configure the receipt monitor processor to: store the receipt data in a receipt data buffer; extract at least one attribute from the receipt data using the receipt monitor processor; and store the at least one attribute into a database stored on the tangible computer-readable medium;
   the receipt monitor modifying the receipt data to produce modified receipt data; and
   the receipt monitor transmitting the modified receipt data to the receipt printer.

2. The POS system according to claim 1, wherein the tangible computer-readable medium further comprises instructions to configure the receipt monitor processor to: structure the receipt data.

3. The POS system according to claim 1, wherein the tangible computer-readable medium further comprises instructions to configure the receipt monitor processor to: encrypt the receipt data.

4. The POS system according to claim 1, wherein the tangible computer-readable medium further comprises instructions to configure the receipt monitor processor to: compresses the receipt data.

5. The POS system according to claim 1, wherein the receipt monitor further comprises a communication channel, and the tangible computer-readable medium further comprises instructions to configure the receipt monitor processor to: transmit the receipt data to a data processing server; and receive the modified receipt data from the data processing server.

6. The POS system according to claim 5, wherein the communication channel is selected from: a Wi-Fi network, a Bluetooth network, a cellular network, and a wired network.

7. The POS system according to claim 1, further comprising a rechargeable battery supplying power to the POS till, the receipt monitor, or both the POS till and the receipt monitor.

8. The POS system according to claim 1, wherein the data interface conforms to at least one of: USB, serial, parallel port, PS/2, Bluetooth, WiFi, cellular, and Ethernet.

9. The POS system according to claim 8, wherein the receipt monitor further comprises an interface board conforming to the data interface cable.

10. The POS system according to claim 1, further comprising a bypass switch to bypass the receipt monitor.

11. The POS system according to claim 1, wherein the modified receipt data comprises at least one of: a coupon, promotional information, a barcode, and a 2D barcode.

12. The POS system according to claim 1, wherein the modified receipt data comprises a cryptocurrency payment address.

13. A data processing server comprising a processor executing instructions from a tangible computer-readable medium, a communication channel, and a database of retail transactions, the instructions comprise:

receiving a receipt data from at least one receipt monitor over the communication channel;

structuring the receipt data into structured data using the processor;

extracting at least one attribute from the structured data using the processor; and storing the at least one attribute into a database stored on the tangible computer-readable medium.

14. The data processing server according to claim 13, wherein the structuring step comprises forming a columnar data table.

15. The data processing server according to claim 13, wherein the instructions further comprise: querying the database to generate at least one aggregated metric.

16. The data processing server according to claim 15, wherein the instructions further comprise: transmitting the at least one aggregated metric to a remote computing system for display.

17. The data processing server according to claim 13, wherein the instructions further comprise: archiving the receipt data; and providing an interface to print an exact reproduction of a receipt corresponding to the receipt data.

18. The data processing server according to claim 13, wherein the instructions further comprise: receiving an identifier from the at least one receipt monitor; and associating the identifier with a transaction history.

19. The data processing server according to claim 18, wherein the instructions further comprise: receiving at least one third party identifier from a remote computing system; associating the at least one third party identifier with the identifier from the at least one receipt monitor; and receiving at least a portion of a third party transaction history when an association occurs between the at least one third party identifier and the identifier from the at least one receipt monitor.

20. The data processing server according to claim 18, wherein the instructions further comprise: transmitting a notification to the receipt monitor when the identifier corresponds to a blacklisted identifier stored in the database.

21. The data processing server according to claim 13, wherein the instructions further comprise: receiving an error message from the receipt monitor; and transmitting a notification to a technician computing device.

22. The data processing server according to claim 18, wherein the instructions further comprise: modifying the receipt data by incorporating at least one of: a coupon and a promotion to produce a modified receipt data; and transmitting the modified receipt data to the receipt monitor.

23. The data processing server according to claim 22, wherein the instructions further comprise: determining a number of coupons distributed by the at least one receipt monitor; and determining a number of coupons redeemed by the at least one receipt monitor.

24. The data processing server according to claim 18, wherein the instructions further comprise: identifying the coupon or the promotion based on at least the identifier and the receipt data.

25. The data processing server according to claim 13, wherein the instructions further comprise: performing an image to text conversion on the receipt data.

* * * * *